F. W. WARNER.
AUTOMATIC GAS VALVE FOR WATER HEATERS.
APPLICATION FILED OCT. 1, 1919.

1,385,853.

Patented July 26, 1921.

INVENTOR.
F. W. Warner.
By J. Edward Maybee.
ATTY.

UNITED STATES PATENT OFFICE.

FREDERICK W. WARNER, OF TORONTO, ONTARIO, CANADA.

AUTOMATIC GAS-VALVE FOR WATER-HEATERS.

1,385,853.  Specification of Letters Patent.  Patented July 26, 1921.

Application filed October 1, 1919. Serial No. 327,657.

*To all whom it may concern:*

Be it known that I, FREDERICK W. WARNER, of the city of Toronto, in the county of York, Province of Ontario, Canada, have invented certain new and useful Improvements in Automatic Gas-Valves for Water-Heaters, of which the following is a specification.

This invention relates to water heaters of the type in which the creation of a flow of water through the heater opens the gas valve, and my object is to devise a very simple valve, operable by the water flow, for the control of the gas, which valve will accurately proportion the flow of gas to the flow of water, and which will close with certainty in case the water supply is cut off.

I attain my object by means of the constructions hereinafter described and illustrated in the accompanying drawings in which—

Figure 1:
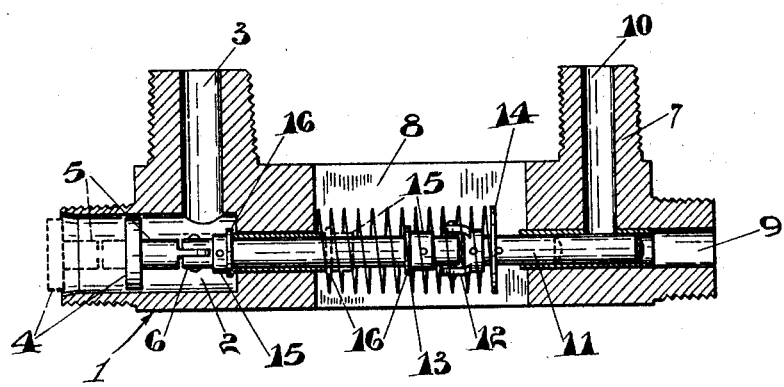

Figure 1 is a longitudinal section of the apparatus; and

Figure 2:
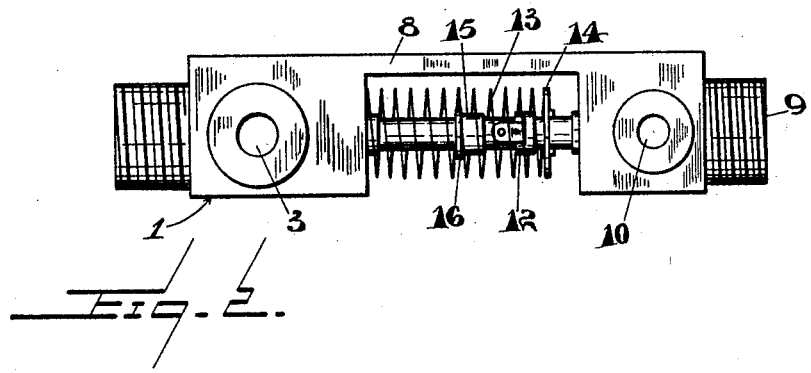

Fig. 2 a plan view of the same.

In the drawings like numerals of reference indicate corresponding parts in the different figures.

1 is a casing provided with a cylindrical chamber 2 and the water inlet 3 leading to the inner end of the chamber. A piston 4 is fitted to slide freely in the cylindrical chamber. It is necessary that the piston should not have a watertight fit in the chamber, but the leakage should preferably be as small as possible. To this piston is secured the piston rod 5, which extends to the rear end of the casing.

As the mechanism is more or less delicate in its operation, I prefer to form a loose joint 6 in the piston rod within the chamber 2, which permits of slight movements of the piston from a position in perfect alinement with the piston rod. This prevents any jamming of the piston in case the cylindrical chamber and the axis of the piston rod are not perfectly concentric and provides for slight lateral movements to prevent the piston being jammed by small pieces of grit or scale.

The piston, it will be noted, is of small thickness relative to its diameter and the end of the cylindrical chamber has its mouth somewhat beveled or belled. Consequently, when the piston is extended to the outer end of the chamber 2 as indicated in dotted lines in Fig. 1, the opening for the passage of water varies more or less gradually according to the position of the piston instead of more or less abruptly as would be the case if the chamber were entirely cylindrical.

7 is the casing of a gas valve. This casing is preferably integrally connected with the casing 1 by the web 8. In this casing I form the inlet gas passage 9 and the outlet gas passage 10 at right angles to one another. The gas passage 9 is in axial alinement with the piston rod 5, and the plunger 11 is slidable therein to open and close the communication between the two passages. If perfect workmanship can be relied on, the plunger 11 might be integral with the piston rod 5. I prefer, however, to make them separate parts connected by the loose coupling 12, so that there can be no binding in case the gas passage 9 and the opening for the piston rod 5 are not in perfect alinement.

For the proper operation of the device it is necessary to provide spring means tending to move the parts to shut off the gas. For this purpose I provide the coil spring 13 bearing at one end against the casing 1 and at the other end against a washer 14 secured on the plunger 11.

The operation of the device is substantially as follows. The inlet passage and the cylindrical chamber of the casing 1 are connected in the water circuit of the water heater, and the inlet 9 and outlet 10 of the gas valve casing in the gas circuit of the heater. Normally the water pressure on the piston 5 assisted by the tension of the spring 13 moves the plunger 11 to shut off the flow of gas. As soon, however, as pressure on the outer end of the piston 4 is relieved, as by the opening of a tap in the water circuit below the valve, the pressure of the flow of water against the back of the piston forces the piston to the position shown in dotted lines in Fig. 1, thus opening up the gas valve. The extent to which the gas valve is opened depends on the rapidity of the flow of water, a rapid flow forcing the piston farther out from the end of the cylindrical chamber than a smaller flow. The instant the flow ceases the gas valve is closed, and further, owing to the employment of the spring, assuming there to be neither flow nor pressure in the water circuit as might be the case if the water supply were shut off, the gas valve is closed by the action of the spring, thus absolutely preventing the overheating of the water in the heater and the generation of steam, which might result in a dangerous explosion.

While the opening for the passage of the piston rod 5 can generally be made a sufficiently close fit to prevent leakage, I prefer to form shoulders 15 on the piston rod 5 inside and outside of the casing, and to fit against these shoulders soft washers 16, which contact with the casing when the valve is either fully open or completely shut to prevent leakage.

It will be seen that the form of the gas valve can be varied from that shown without departing from the essential features of my invention.

What I claim as my invention is:—

1. An automatic valve comprising oppositely disposed casings, one of said casings formed with a cylindrical chamber, the other of said casings formed with gas inlet and outlet passages, a piston movable by water flow through the waterways, and fitted to slide freely in the cylindrical chamber, a piston rod secured to the piston and passing through the inner end of the chamber, a plunger longitudinally slidable in the gas outlet passage, a hinge joint coupling connected to the piston rod and plunger and a spring interposed between the said casings and encircling the portions of the piston rod and plunger extending across the web of the valve.

2. An automatic valve comprising oppositely disposed casings a restricted web connecting said casings, one of said casings formed with a cylindrical chamber and inlet and outlet waterways, the other casing formed with gas inlet and outlet passages, a piston movable by water flow through the waterways and being fitted to slide freely in the cylindrical chamber, a piston rod secured to said piston and passing through the inner end of the chamber, a plunger longitudinally slidable in the gas outlet passage, a hinge joint coupling connection between said piston rod and plunger, a washer arranged on said plunger, a spring encircling the connected ends of said piston rod and plunger and having one end connected to said washer, and the opposite end of said spring adapted for engagement with the first mentioned casing adjacent the web of the valve.

3. An automatic valve constructed substantially as set forth in claim 2 in which the casings and web are of integral construction.

Signed at Toronto, Canada, this 24th day of September 1919.

FREDERICK W. WARNER.